(12) United States Patent
Harnefors et al.

(10) Patent No.: US 10,193,469 B2
(45) Date of Patent: Jan. 29, 2019

(54) MULTI-LEVEL POWER CONVERTER AND A METHOD FOR CONTROLLING A MULTI-LEVEL POWER CONVERTER

(71) Applicant: ABB SCHWEIZ AG, Baden (CH)

(72) Inventors: Lennart Harnefors, Eskilstuna (SE); Tomas Tengner, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/579,399

(22) PCT Filed: Jun. 29, 2015

(86) PCT No.: PCT/EP2015/064753
§ 371 (c)(1),
(2) Date: Dec. 4, 2017

(87) PCT Pub. No.: WO2017/000984
PCT Pub. Date: Jan. 5, 2017

(65) Prior Publication Data
US 2018/0138825 A1    May 17, 2018

(51) Int. Cl.
*H02M 7/483* (2007.01)
*H02J 3/32* (2006.01)
*G05B 11/01* (2006.01)

(52) U.S. Cl.
CPC ............ *H02M 7/483* (2013.01); *G05B 11/012* (2013.01); *H02J 3/32* (2013.01); *H02M 2007/4835* (2013.01)

(58) Field of Classification Search
CPC .......... H02M 7/63; H02M 7/81; H02M 7/217; H02M 7/483; H02M 7/797; H02M 1/4216;
(Continued)

(56) References Cited

U.S. PATENT DOCUMENTS 8,760,122 B2   6/2014  Demetriades
8,848,401 B2   9/2014  Green et al.
(Continued)

FOREIGN PATENT DOCUMENTS

DE    10 2011 017 597 A1    10/2012
EP        2 544 327 A1     1/2013
(Continued)

OTHER PUBLICATIONS

International Preliminary Report on Patentability, issued in PCT/EP2015/064753, dated Jun. 12, 2017.
(Continued)

*Primary Examiner* — Yemane Mehari
(74) *Attorney, Agent, or Firm* — Birch, Stewart, Kolasch & Birch, LLP

(57) ABSTRACT

A multi-level power converter for one or more phases includes one or more converter arms including a plurality of serial connected switching cells. Each switching cell includes a plurality of switching devices, a primary energy storage, a secondary energy storage and a first inductor. The switching devices are arranged to selectively provide a connection to the primary energy storage, wherein each switching cell includes a bridge circuit including the switching devices and the primary energy storage, a battery circuit connected to the bridge circuit and including the secondary energy storage, and an arm circuit providing a connection between two adjacent switching cells. The first inductor of each switching cell is arranged in the arm circuit.

20 Claims, 3 Drawing Sheets

(58) Field of Classification Search
CPC ........ H02M 1/4233; H02M 2007/4835; G05B 11/012; H02J 3/18; H02J 3/1842; H02J 3/1857; H02J 3/24; H02J 3/28; H02J 3/32; H02J 3/36
USPC .................................................... 363/35, 74
See application file for complete search history.

(56) References Cited

U.S. PATENT DOCUMENTS

| | | | |
|---|---|---|---|
| 2011/0235376 A1* | 9/2011 | Feng ................... | H02M 7/483 363/65 |
| 2012/0043816 A1 | 2/2012 | Pereira | |
| 2014/0028266 A1* | 1/2014 | Demetriades ............ | H02J 3/32 320/136 |
| 2014/0167726 A1* | 6/2014 | Eckert ...................... | H02J 3/28 323/311 |
| 2014/0197778 A1 | 7/2014 | Kim | |
| 2015/0229234 A1* | 8/2015 | Park ....................... | H02M 1/12 363/78 |

FOREIGN PATENT DOCUMENTS

| | | |
|---|---|---|
| WO | WO 2010/124706 A1 | 11/2010 |
| WO | WO 2012/010055 A1 | 1/2012 |
| WO | WO 2012/024984 A1 | 3/2012 |
| WO | WO 2013/137749 A1 | 9/2013 |

OTHER PUBLICATIONS

International Search Report, issued in PCT/EP2015/064753, dated Jan. 29, 2016.
Written Opinion of the International Searching Authority, issued in PCT/EP2015/064753, dated Jan. 29, 2016.

\* cited by examiner

MULTI-LEVEL POWER CONVERTER AND A METHOD FOR CONTROLLING A MULTI-LEVEL POWER CONVERTER

FIELD OF THE INVENTION

The present invention relates to a multi-level power converter for one or more phases. The converter comprises one or more converter arms comprising a plurality of serial connected switching cells. Each switching cell comprises a plurality of switching devices, a primary energy storage, a secondary energy storage and a first inductor. The switching devices are arranged to selectively provide a connection to the primary energy storage. Each switching cell comprises a bridge circuit comprising the switching devices and the primary energy storage, a battery circuit connected to the bridge circuit and comprising the secondary energy storage, and an arm circuit providing a connection between two adjacent switching cells.

The present invention also relates to a method for controlling a multi-level power converter.

PRIOR ART

Multi-level converters are used for converting DC electric power to AC electric power or AC electric power to DC electric power. Multilevel converters are found in many high power applications in which medium to high voltage levels are present in the system.

When forming an AC voltage from a DC voltage, the multi-level converter forms the AC voltage in small voltage steps by means of that a controller accurately controls the switching devices in the bridge circuit of the switching cells. Thereby, the charging and discharging of the primary energy storage are controlled so that the converter outputs the desired AC voltage.

The switching devices of the switching cells are for example integrated gate-commutated thyristor (IGCT), gate turn-off thyristor (GTO) and an insulated-gate bipolar transistor (IGBT). The primary energy storages of the switching cells are usually capacitors but also batteries may be used.

In order to enable multi-level converters to be used for converting energy from renewable energy sources that involve peaks and dips in generated power, the power converters may be provided with a secondary energy storage, such as one or more batteries or supercapacitors. The power converter requires an inductance per switching cell in order facilitate a smooth current to and from the secondary energy storage.

WO2010/124706A1 discloses a modular multilevel converter comprising a plurality of converter arms that each comprises a plurality of switching cells connected in series. Each cell comprises a capacitor unit, power semiconductors in a bridge arrangement and an energy storage device controlled by a chopper device comprising an inductance.

OBJECTS AND SUMMARY OF THE INVENTION

The object of the present invention is to provide an improved multi-level converter provided with a secondary energy storage for converting energy from a renewal energy source. In particular, a first object of the invention is to provide a multi-level converter configured with an alternative mode of operation. A second object of the invention is to provide multi-level converter that enables the secondary energy storage to be isolated in case of a fault. A third object of the invention is to provide multilevel converter that provides smooth current of the secondary energy storage with a reduced inductance per switching cell.

This object is obtained by a multi-level power converter that comprises one or more converter arms comprising a plurality of serial connected switching cells, each switching cell comprises a plurality of switching devices, a primary energy storage, a secondary energy storage and a first inductor, which switching devices are arranged to selectively provide a connection to the primary energy storage, wherein each switching cell comprises a bridge circuit comprising the switching devices and the primary energy storage, a battery circuit connected to the bridge circuit and comprising the secondary energy storage, and an arm circuit providing a connection between two adjacent switching cells. The converter is characterized in that the inductor of each switching cell is arranged in the arm circuit.

By means of arranging the inductor in the arm circuit, the inductor can have a significant lower inductance compared with prior art multi-level converters.

A further advantage is that the multi-level converter of the invention enables an alternative way of operation by controlling the switching devices. In particular, the multi-level converter enables isolation of the secondary energy storage in the event of a fault.

The multi-level converter of the invention has however the drawback that the current rating of the cell inductor is higher compared with prior art multi-level converters.

The circuit of the secondary energy storage is denoted "battery circuit". However, the second energy storage is not restricted to batteries, such as electrochemical batteries. Also other types of energy storage may be used such an arrangement of one or more supercapacitors.

According to an embodiment of the invention, the bridge circuit comprises a first and second switching device connected in series between a first and second terminal of the primary energy storage and a third and fourth switching device connected in series between the first and second terminal of the primary energy storage.

The bridge circuit of the multi-lever converter comprises a full H-bridge arrangement comprising the first, second, third and fourth switching devices.

According to an embodiment of the invention, the switching devices of the bridge circuit comprise one of an integrated gate-commutated thyristor, a gate turn-off thyristor and an insulated-gate bipolar transistor.

According to an embodiment of the invention, the battery circuit is connected in parallel to the bridge circuit and the arm circuit.

According to an embodiment of the invention, the arms of the converter comprises a second inductor arranged connected in series with the switching cells. The second inductor has the function to reduce the flow of transient current between different the converter arms.

According to an embodiment of the invention, the self-inductance of the second inductor is larger than the self-inductance of the first inductor.

According to an embodiment of the invention, the converter comprises a first arm part and a second arm part per phase.

According to an embodiment of the invention, each of the first arm part and the second arm part comprises the second inductor.

According to an embodiment of the invention, the primary energy storage is a capacitor.

According to an embodiment of the invention, the secondary energy storage comprises one or more battery or one or more supercapacitors.

The object of the invention is further obtained by a method for operating a multi-level power converter according to any of claim 1-9. The method comprises connecting the primary energy storage with the arm circuit by means of closing the first switching device and opening the second switching device.

According to an embodiment of the invention, the method comprises disconnecting the primary energy storage from the arm circuit by means of opening the first switching device and closing the second switching device.

According to an embodiment of the invention, the method comprises connecting the primary energy storage with the battery circuit by means of closing the third switching device and opening the fourth switching device.

According to an embodiment of the invention, the method comprises disconnecting the primary energy storage from the battery circuit by means of opening the third switching device and closing the fourth switching device.

According to an embodiment of the invention, the method comprises isolating the secondary energy storage by means of opening the third switching device and the fourth switching device.

According to an embodiment of the invention, the method comprises switching the third and the fourth switching device at a higher frequency than the switching frequency of the first and the second switching device.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
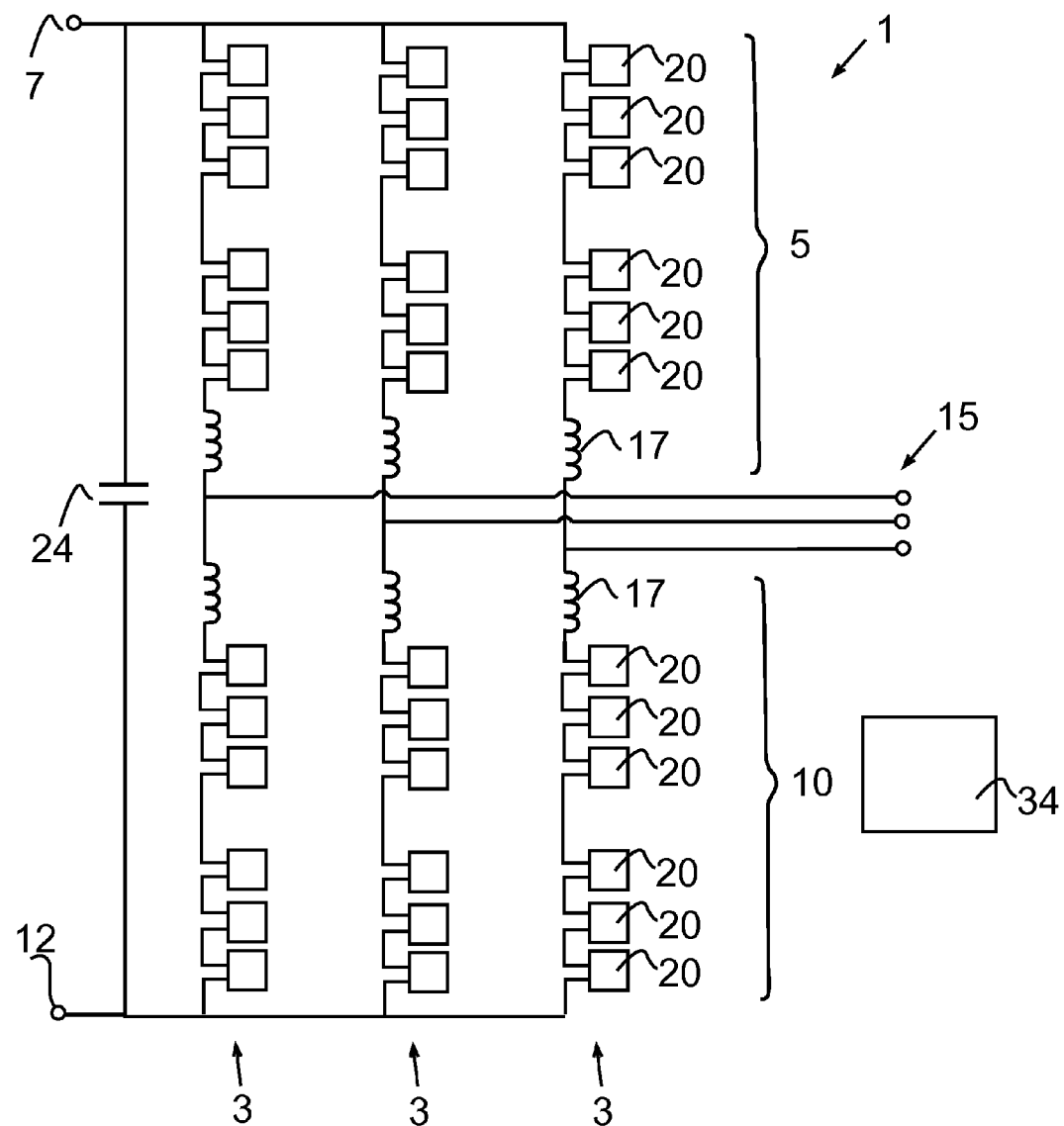
FIG. 1 discloses an example of a prior art multi-level power converter for three phases.

FIG. 1 shows an example of a prior art multi-level power converter 1 for converting DC electric power to AC electric power for three phases. The converter 1 comprises an arm 3 for each phase. Each arm 3 comprises a first arm part 5 connected to an input terminal 7 with first potential of the DC power and a second arm part 10 connected to an input terminal 12 with a second potential of the DC power. The first arm part 5 and the second arm part 10 are connected to an output terminal 15 of the AC power for the respective phase.

Each arm 3 comprises plurality of switching cells 20 connected in serial. In FIG. 1, the first arm part 5 and the second arm part 10 each includes six switching cells 20. Each of the first arm part 5 and the second arm part 10 also comprises a second inductor 17 for reducing flow of transient current between the arms 3. In the disclosed example, a capacitor 24 is connected in parallel to the three arms 3.

Figure 2:
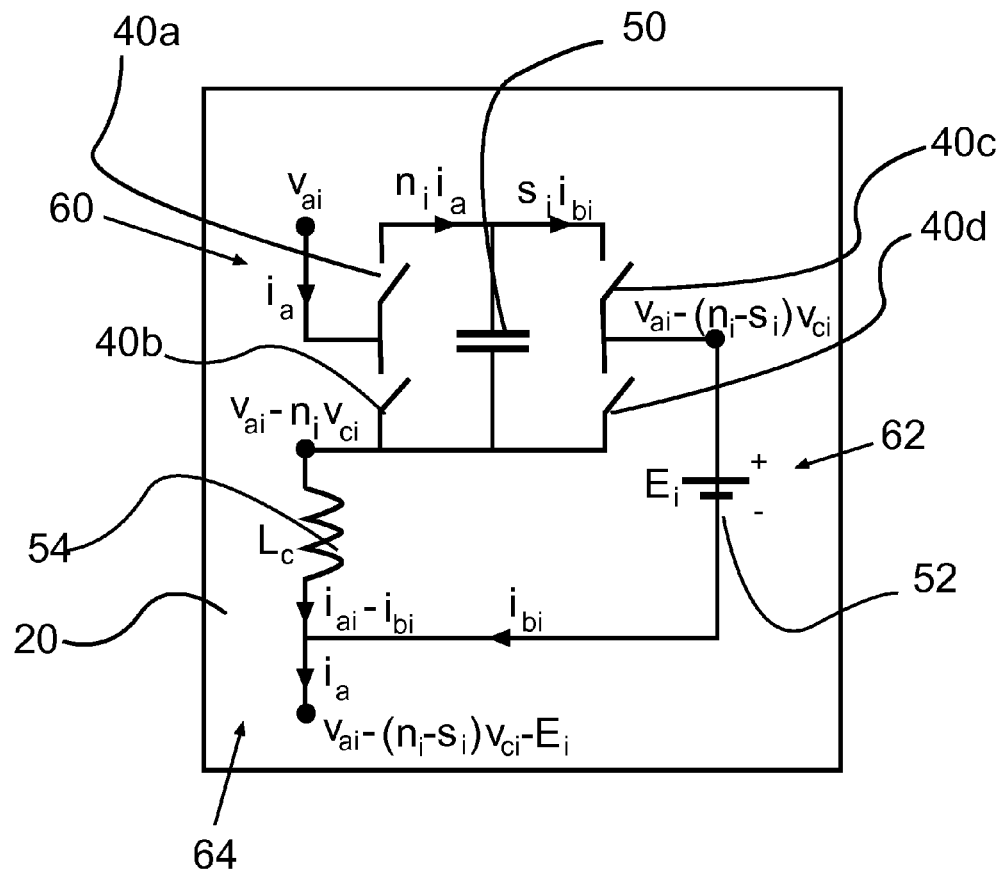
FIG. 2 discloses an example of a switching cell of the converter in FIG. 1.

An example of a switching cell 20 is shown in FIG. 2. The switching cell 20 comprises four switching devices 40a, 40b, 40c, 40d, a primary energy storage 50, a secondary energy storage 52 and a first inductor 54.

The switching cells 20 are arranged so that it comprises a bridge circuit 60, a battery circuit 62 and an arm circuit 64.

The bridge circuit 60 comprises the four switching devices 40a, 40b, 40c, 40d and the primary energy storage 50 arranged as a full H-bridge arrangement. The bridge circuit 60 is arranged comprising a first switching device 40a and a second switching device 40b connected in series between a first and second terminal of the primary energy storage 50, and a third switching device 40c and a fourth switching device 40d connected in series between the first and second terminal of the primary energy storage 50.

The switching operation of the first switching device 40a and the second switching device 40b is adapted to be controlled by a controller 34 so that the primary energy storage 50 of the switching cells 20 is discharged or charged, wherein the desired AC power is formed.

The battery circuit 62 comprises the secondary energy storage 52 that is adapted to be charged and discharged during operation of the converter 1 in order to even out irregularities in supplied power that is to be converted by the converter 1, such as supplied power from renewable energy.

The primary energy storage 50 is preferably a capacitor. However other types of energy storage devices such as a battery may be used. The secondary energy storage 52 is preferably a battery, such as an electrochemical battery. However, other types of energy storage devices such as a plurality of supercapacitors may be used.

The switching operation of the third switching device 40c and the fourth switching device 40d is adapted to be controlled by the controller 34 so that the secondary energy storage 52 of the switching cell 20 is discharged or charged in order to boost the conversion of power in case of low supply from the energy source.

The first inductor 54 that has the function to provide a smooth current to and from the second energy storage 52 that is arranged connected in parallel to the bridge circuit 60 and the arm circuit 64. The arm circuit 64 is arranged to provide a connection between two adjacent switching cells 20.

An advantage of arranging the first inductor 54 in the arm circuit 64 instead of in the battery circuit 62 is that it allows the self-inductance of the first inductor 54 to be significantly reduced. The self-inductance is reduced but can however not be completely eliminate without implication to the function of converter 1.

Figure 3:
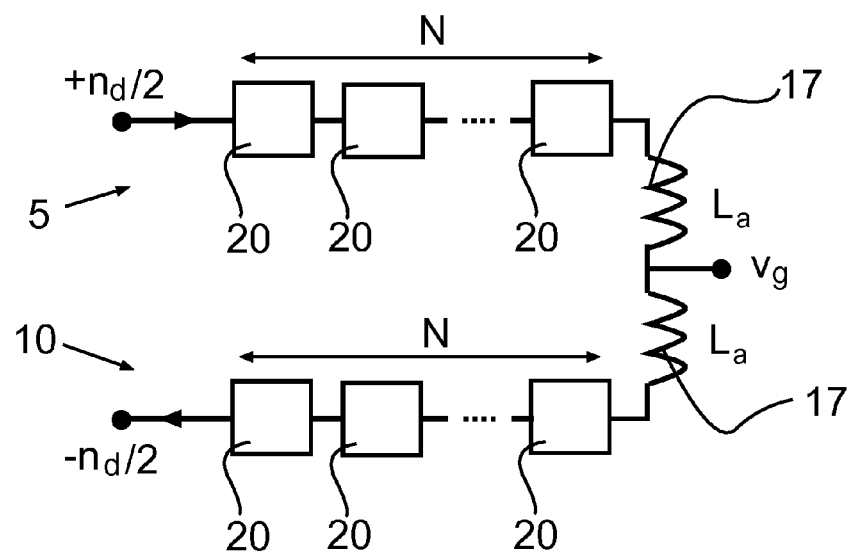
FIG. 3 discloses an example of a schematic view of one phase of the converter comprising N switching cells.

The function of the converter will be discussed in further details with reference to FIGS. 2 and 3. FIG. 3 discloses an example of the converter arm 3 where the first arm part 5 comprises N switching cells 20 and where the second arm part 10 comprises N switching cells 20.

The circuit in FIG. 2 shows the circuit diagram of the i-th switching cell 20. The letter v indicates the electric potential at the point marked by an adjacent dot. All switching cells 20 are assumed to have equal inductances $L_c$ and capacitances $C_c$. Resistances are neglected.

All variables except the arm current $i_a$ are unique for each switching cells 20 and are denoted with the index i. By subtracting the potentials at the points on each side of the inductor, the following relation is established:

$$L_c \frac{d(i_a - i_{bi})}{dt} = E_i - s_i v_{ci}. \qquad (1)$$

It is desired that $i_{bi}$ should be smooth, i.e., $di_{bi}/dt=0$. Hence, the insertion index for the right-side switches shall ideally be selected as $$s_i = \frac{E_i - L_c \frac{di_a}{dt}}{v_{ci}}. \tag{2}$$

However, it shall be noted that this is only the average insertion index and therefore does not take into account switching harmonics. The voltage drop $\Delta v_i$ across the cell is given by $$\Delta v_i = E_i + (n_i - s_i) v_{ci} \tag{3}$$

Substituting (2) in (3) yields $$\Delta v_i = E_i + \left(n_i - \frac{E_i - L_c \frac{di_a}{dt}}{v_{ci}}\right) v_{ci} \tag{4}$$

$$= n_i v_{ci} - L_c \frac{di_a}{dt}$$

and adding up the voltages of all N cells in the arm yields, for the first arm part 5

$$\frac{v_d}{2} - \sum_{i=1}^{N} \left( n_i v_{ci} - L_c \frac{di_a}{dt} \right) - L_a \frac{di_a}{dt} = v_g \tag{5}$$

$$\Rightarrow (L_a + NL_c) \frac{di_a}{dt} = \frac{v_d}{2} - \sum_{i=1}^{N} n_i v_{ci} - v_g.$$

This shows that, as long as switching harmonics are disregarded, when cascading the switching cells 20 in a converter arm 5, 10, the invention gives a total equivalent arm inductance of $L_a + NL_c$. However, this does not account for harmonics. Inductance $L_a$ and the switching frequencies of the two pairs of switching devices 40a, 40b, 40c, 40d must be properly selected to give an acceptably low harmonic content of $i_a$.

Figure 4:
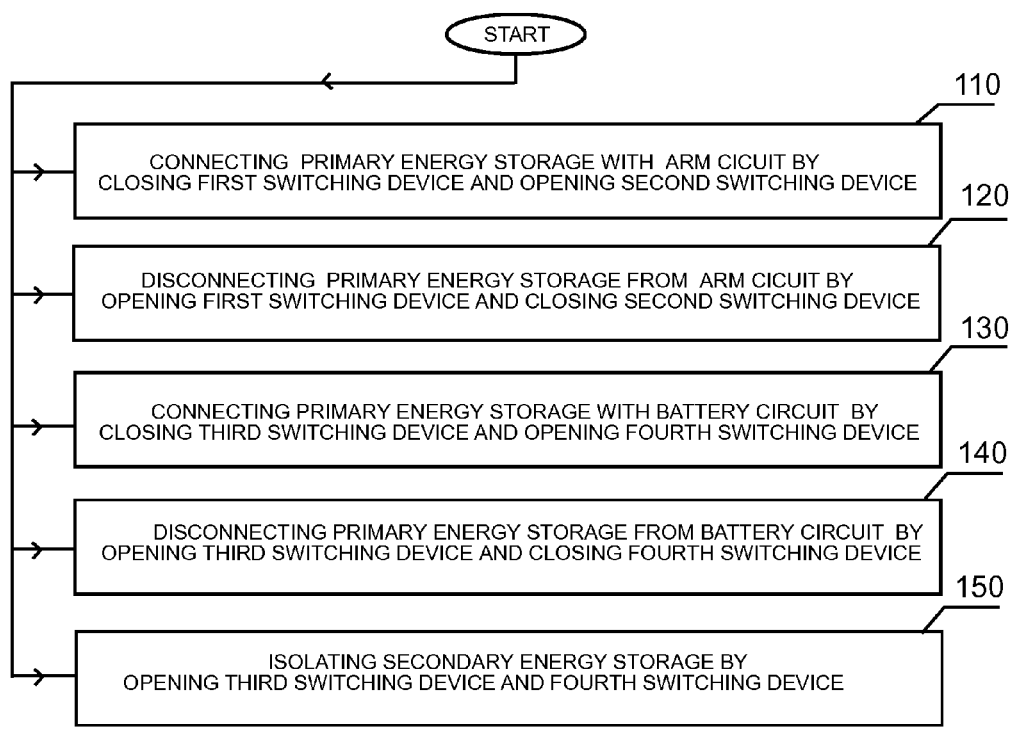
FIG. 4 disclosed a method for operating a multi-level power converter according to an embodiment of the invention.

FIG. 4 disclosed a method for operating a multi-level power converter 1 according to any of claim 1-9. The method comprises controlling the switching devices 40a, 40b, 40c, 40d of the bridge circuit 60.

The method comprises a step 110 comprising connecting the primary energy storage 50 with the arm circuit 64 by means of closing the first switching device 40a and opening the second switching device 40b. The method step results in a positive output voltage from the switching cell 20.

The method comprises a step 120 comprising disconnecting the primary energy storage 50 from the arm circuit 64 by means of opening the first switching device 40a and closing the second switching device 40b. The method step results in zero output voltage from the switching cell 20. The primary energy storage 50 is being charged until it is fully charged It shall be understood that the method steps 110 and 120 relate to independent states of the switching cells and accordingly the steps of the method are not executed in any particular order. Instead the controller 34 controls the plurality of switching cells 20 by applying step 110 and 120 according to a certain switching algorithm over time so that the desired current is formed.

The method comprises a step 130 comprising connecting the primary energy storage 50 with the battery circuit 62 by means of closing the third switching device 40c and opening the fourth switching device 40d. The method step results in boosted output voltage from the switching cell 20.

The method comprises a step 140 comprising disconnecting the primary energy storage 50 from the battery circuit 62 by means of opening the third switching device 40c and closing the fourth switching device 40d. The method step results in that the secondary energy storage 52 is not involved in boosting the output voltage of the converted power. The secondary energy storage 52 is instead being charged until it is fully charged The method comprises a step 150 comprising isolating the secondary energy storage 52 by means of opening the third switching device 40c and the fourth switching device 40d. The method step can be used in fault situation to disconnect the second energy storage 52 from the switching cell 20.

It shall further be understood that the method steps 110 and 120 are alternated during operation of the converter 1. Likewise, the method steps 130 and 140 are alternated. Accordingly, the process of alternating between the control of the primary energy storage 50 and between the control of the secondary energy storage 52 take place simultaneously. Under normal condition the switching frequency of the switching operation of the third switching device 40c and the fourth switching device 40s is executed at a higher frequency than the switching frequency of the switching operation of the first switching device 40a and the second switching device 40b.

The present invention is not limited to the disclosed embodiments but may be modified within the framework of the claims.

The invention claimed is:

1. A multi-level power converter for one or more phases, the converter comprises one or more converter arms comprising a plurality of serial connected switching cells, each switching cell comprises a plurality of switching devices, a primary energy storage, a secondary energy storage and a first inductor, the switching devices being arranged to selectively provide a connection to the primary energy storage, wherein each switching cell comprises a bridge circuit comprising the switching devices and the primary energy storage, a battery circuit connected to the bridge circuit and comprising the secondary energy storage, and an arm circuit providing a connection between two adjacent switching cells, wherein the bridge circuit comprises a first switching device and second switching device connected in series between a first and second terminal of the primary energy storage and a third switching device and fourth switching device connected in series between the first and second terminal of the primary energy storage, wherein the first inductor of each switching cell is arranged in the arm circuit, said arm circuit being connected between the second terminal of the primary energy storage and a point of connection to an adjacent switching cell, said battery circuit being connected between the point of connection of the adjacent cell and the bridge circuit, wherein the battery circuit is connected to the bridge circuit between the third switching device and the fourth switching device of the primary energy storage.

2. The multi-level power converter according to claim 1, wherein the switching devices of the bridge circuit comprise one of an integrated gate-commutated thyristor, a gate turn-off thyristor and an insulated-gate bipolar transistor.

3. The multi-level power converter according to claim 1, wherein each of the one or more converter arms comprises at least one second inductor arranged connected in series with the switching cells.

4. The multi-level power converter according to claim 1, wherein the converter comprises a first arm part and a second arm part per phase.

5. The multi-level power converter according to claim 1, wherein the primary energy storage is a capacitor.

6. The multi-level power converter according to claim 1, wherein the secondary energy storage comprises one or more battery or one or more supercapacitors.

7. The multi-level power converter according to claim 1, wherein a first terminal of said battery circuit is directly connected to a point of connection of the third switching device and the fourth switching device, and a second terminal of said battery circuit is directly connected to the first inductor.

8. The multi-level power converter according to claim 2, wherein each of the one or more converter arms comprises at least one second inductor arranged connected in series with the switching cells.

9. The multi-level power converter according to claim 2, wherein the converter comprises a first part and a second arm part per phase.

10. The multi-level power converter according to claim 2, wherein the primary energy storage is a capacitor.

11. The multi-level power converter according to claim 3, wherein the converter comprises a first arm part and a second arm part per phase.

12. The multi-level power converter according to claim 3, wherein the primary energy storage is a capacitor.

13. The multi-level power converter according to claim 4, wherein each of the first aim part and the second arm part comprises a second inductor.

14. A method for operating a multi-level power converter for one or more phases, the converter comprises one or more converter arms comprising a plurality of serial connected switching cells, each switching cell comprises a plurality of switching devices, a primary energy storage, a secondary energy storage and a first inductor, the switching devices being arranged to selectively provide a connection to the primary energy storage, wherein each switching cell comprises a bridge circuit comprising the switching devices and the primary energy storage, a battery circuit connected to the bridge circuit and comprising the secondary energy storage, and an arm circuit providing a connection between two adjacent switching cells, wherein the bridge circuit comprises a first switching device and second switching device connected in series between a first and second terminal of the primary energy storage and a third switching device and fourth switching device connected in series between the first and second terminal of the primary energy storage, wherein the first inductor of each switching cell is arranged in the arm circuit, said arm circuit being connected between the second terminal of the primary energy storage and a point of connection to an adjacent switching cell, said battery circuit being connected between the point of connection of the adjacent cell and the bridge circuit, wherein the battery circuit is connected to the bridge circuit between the third switching device and the fourth switching device of the primary energy storage, and wherein the method comprises connecting the primary energy storage with the arm circuit by closing the first switching device and opening the second switching device.

15. The method according to claim 14, wherein the method comprises disconnecting the primary energy storage from the arm circuit by means of opening the first switching device and closing the second switching device.

16. The method according to claim 14, wherein the method comprises connecting the primary energy storage with the battery circuit by means of closing the third switching device and opening the fourth switching device.

17. The method according to claim 14, wherein the method comprises disconnecting the primary energy storage from the battery circuit by means of opening the third switching device and closing the fourth switching device.

18. The method according to claim 14, wherein the method comprises isolating the secondary energy storage by means of opening the third switching device and the fourth switching device.

19. The method according to claim 14, wherein the method comprises switching the third switching device and the fourth switching device at a higher frequency than the switching frequency of the first switching device and the second switching device.

20. The method according to claim 14, wherein a first terminal of said battery circuit is directly connected to a point of connection of the third switching device and the fourth switching device, and a second terminal of said battery circuit is directly connected to the first inductor.

* * * * *